Patented July 19, 1938

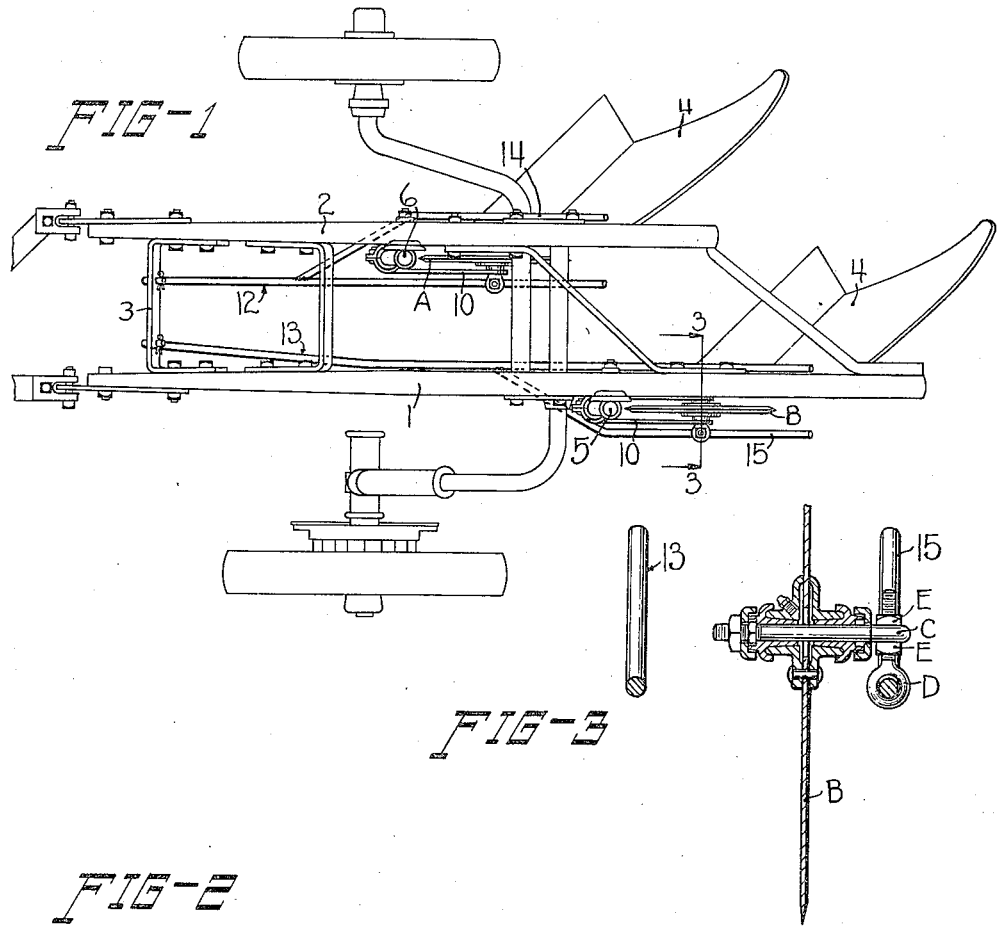
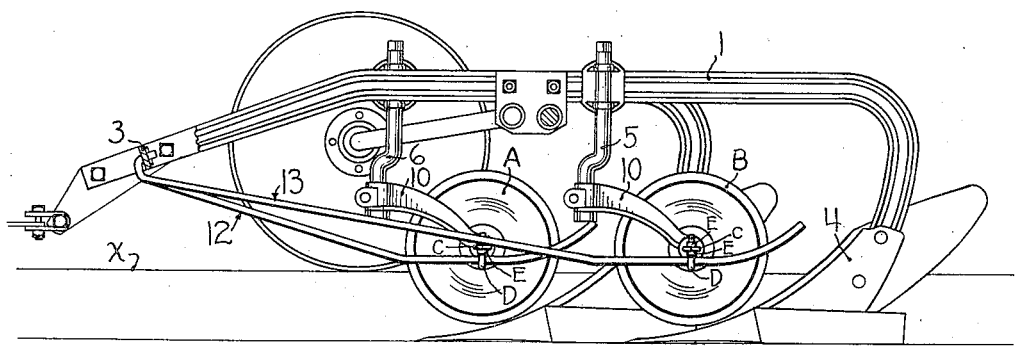

2,124,128

UNITED STATES PATENT OFFICE 2,124,128

TRASH GUIDE FOR PLOWS

Carl G. Strandlund, Moline, Ill., assignor to Deere & Company, Moline, Ill., a corporation of Illinois Application October 7, 1935, Serial No. 43,806
Renewed November 16, 1936

20 Claims. (Cl. 97—193)

My invention relates to plows and more particularly to that type in which disk colters are commonly employed to cut the sod and surface trash so that it can more readily be covered in the furrows as the plow advances. Such trash consisting of stalks, weeds, grass or other deleterious matter, is liable to clog the colter to a degree that the efficiency thereof will be materially reduced.

The principal object of my invention is to provide an improved device which not only prevents an accumulation of trash on the colter but also effectively operates to hold such objectionable matter as stalks, vines and weeds firmly on the surface of the ground so that they can be readily cut by the colter and turned into the furrow whereby they are more thoroughly rotted and their fertilizing value more fully distributed for enrichment of the soil.

A further object relates to the provision of a trash guide which is easily and quickly removable.

Another object has to do with providing improved supporting structure for the trash guide in order to obtain increased strength without sacrificing lightness and ease of installation.

Still another object of the invention relates to the provision of means for adjusting the guide relative to the colter.

Referring to the drawing—

Figure 1 is a plan view of a wheeled plow to which my invention is attached;

Figure 2 is a side elevation; and,

Figure 3 is a detail section on the line 3—3 of Figure 1.

The plow shown in the drawing consists of two complete units similar in construction and of a well known type. The plow beams 1 and 2 are spaced apart and connected by a cross bar 3 and suitable braces extending from one beam to the other and securely bolted to each beam. A plow body 4 is mounted on the beam 1 and a similar body is mounted on the beam 2. Standards 5 and 6 are adjustably secured on the beams 1 and 2, respectively; the standards are cranked, as usual, and on the cranked ends are mounted rearwardly extending bifurcated members 10 between and on the arms of which disk colters A and B of a well known type are rotatably supported.

My invention, as shown, consists of a trash guide comprising presser rods 12 and 13 having their forward ends loosely attached to the cross bars 3 from which they extend downwardly and rearwardly toward the colters. At a point in advance of the colters the rods are bent to parallelism with the ground and reach rearwardly of the colters and are then curved upwardly. Welded, or otherwise secured to the rod 12, is a rod 14 which extends in a furrowward direction to a point adjacent to and forwardly of the colter A from which point it projects rearwardly parallel with the rod 12 and terminates with a similar curve. The rod 14 is spaced from the furrowward side of the colter A a sufficient distance to extend over the share and moldboard, furrowward of the cutting edge of the plow, in order that material cut by the colter will be caught and covered in the turn of the sod.

The rod 13 is similar to the rod 12 and is supported adjacent the colter B similarly to the support of the rod 12 adjacent the colter A. In this instance, however, the rod 15, similar to the rod 14, is attached to the rod 13 and extends rearwardly on the landward side of the colter B, this difference in construction being desirable in a two gang plow, as shown; otherwise a bracket or similar device will have to be carried by one of the beams to which the forward end of one of the rods would be attached, as in the use of my device on a single plow on which its practical usefulness has also been demonstrated. As before stated, the rods are supported on the colter mechanism at the landward side thereof and move freely longitudinally on the support with the vertical adjustment of the colters, and can be adjusted vertically independently of the adjustment of the colters and are readily attached or removed from a plow in which a disk colter is used. Consequently it is classed among new articles of manufacture with a distinct value as an accessory to a plow of the type described.

As previously stated, the colters A and B are mounted between the rearwardly extending arms of the members 10. I employ eye-bolts C as axles for the colters, the eye-bolts extending through the arms of the members 10 and the hubs of the colters and secured therein by nuts on the furrowward ends of the bolts, the eyes of the bolts being located on the landward side of the arms of the members 10 and disposed horizontally. Eye-bolts D extend vertically through the eyes of the bolts C and are threaded for nuts E above and below the bolts C. The rods 12 and 15 are loosely supported in the eyes of the vertical bolts D; they extend through the eyes thereof and are adjustable vertically by manipulation of the nuts E to raise or lower the bolts D to adjust the rods to conform with the adjustment of the colters for varied depths of plowing. As the rods 12 and 13 are attached to the rods 14 and 15, they are adjusted simultaneously therewith. This adjustment is provided so that the colter is adjustable for various depths of plowing. The guide can be independently adjusted to the proper position relative to the ground to obtain maximum efficiency of operation under different trash conditions in preventing clogging of the colter with trash and in holding the trash to the ground for cutting action of the colter.

Figure 2 of the drawing illustrates the position of the parts for deep plowing, the surface line indicated at X. The colters are adjusted vertically by loosening the clamps which secure the standards, on which the colters are supported, to the plow beams, and after raising or lowering the standards to set the colters to the depth of cutting desired, the clamps are again secured to the plow beams. I do not limit myself, however, to this precise method of supporting the rods on the colters as it is evident other means can be utilized to support the rods in the same position as shown and described.

What I claim is:—

1. The combination with a plow having a colter carrying arm mounted for vertical adjustment with respect to said plow, of a presser rod mounted at the forward end of the plow for vertical swinging movement with respect to the plow, said presser rod extending rearwardly longitudinally of the plow, and means on said arm for supporting the rear end of said presser rod, said supporting means permitting said presser rod to slide longitudinally relative to said supporting means when said arm is adjusted vertically with respect to the plow.

2. The combination with a plow having a colter supported on an arm mounted for vertical adjustment with respect to said plow, of a presser rod mounted at the forward end of the plow for vertical swinging movement with respect to the plow, said presser rod extending rearwardly longitudinally of the plow and being bifurcated at its rear end into two sections, the two sections thereof being disposed alongside of and on opposite sides of the colter, and means on said arm for supporting one of said sections, whereby said presser rod is supported in proper operating position with respect to said colter, said supporting means permitting said one section to slide relative to said supporting means when said arm is adjusted vertically relative to the plow.

3. In combination with a plow beam, a plow body mounted on the beam, a standard secured on the beam and vertically adjustable, a bifurcated member attached to the lower end of the standard and extending rearwardly, a disk colter operatively mounted between the arms of said member at the rear ends thereof, a presser rod attached to the forward part of the beam and extending downwardly and rearwardly to a given point in advance of the colter and thence rearwardly in parallelism with the ground and curved upwardly rearwardly of the colter, and a vertically adjustable support for said rod mounted on the landward arm of said member adjacent the axis of the colter and in which the rod is loosely held.

4. In combination with a plow beam, a plow body mounted on the beam, a standard secured on the beam and vertically adjustable, a bifurcated member attached to the lower end of the standard and extending rearwardly, a disk colter operatively mounted between the arms of said member at the rear ends thereof and adjustable with the standard for various depths of plowing, a presser rod attached forwardly to the beam and extending rearwardly and downwardly to a point forwardly of the colter thence rearwardly in parallelism with the ground and rearwardly of the colter, a support for said rod mounted on the landward side of the bifurcated member adjacent the axis of the colter, said support being adjustable irrespective of the colter whereby the operative position of the rod close to the ground is varied as the adjustment of the colter for various depths of plowing.

5. The combination with a plow beam, of a standard secured to the beam, a bifurcated member secured on the lower end of the standard having its arms extended rearwardly, a disk colter supported between said arms at the rear ends thereof, a presser rod connected forwardly to the beam and extending downwardly and rearwardly to a fixed distance forward of the colter, thence rearwardly on the landward side of the colter parallel with the ground and curving upwardly rearward of the colter, a support on said member, adjacent the axis of the colter, in which said rod is loosely held, and a rod secured to the first mentioned rod forwardly of the colter and extending rearwardly on the furrow-ward side of the colter.

6. In combination with a plow beam, a plow body mounted on the beam, a standard mounted on the beam and vertically adjustable, a bifurcated member attached to the lower end of the standard and extending rearwardly, a disk colter mounted between the arms of said member at the rear ends thereof and adjustable with the standard for various depths of plowing, a presser rod attached forwardly to the beam and extending downwardly and rearwardly to a given distance in advance of the colter and thence rearwardly on one side of the colter and in parallelism with the ground, a similar rod rigidly attached to the first mentioned rod and extending rearwardly on the opposite side of the colter, both of said rods terminating in an upward curve rearwardly of the colter.

7. In combination with a plow beam, a plow body mounted on the beam, a standard mounted on the beam and vertically adjustable, a bifurcated member attached to the lower end of the standard and extending rearwardly, a disk colter mounted between the arms of said member and at the rear ends thereof and adjustable with the standard for various depths of plowing, a presser rod attached to the forward part of the beam and extending downwardly and rearwardly to a fixed distance in advance of the colter and thence rearwardly parallel with the ground and on one side of the colter, a similar rod rigidly attached to the first mentioned rod forwardly of the colter and extending rearwardly on the opposite side of the colter, and a support for one of said rods on the landward side of said member adjacent the axis of the colter freely movable longitudinally on said support, said support being adjustable vertically whereby said rods are raised or lowered to conform with the adjustment of the colter for various depths of plowing.

8. In combination with a plow having a colter-carrying arm mounted for vertical adjustment with respect to said plow, a colter mounted on said arm, a presser rod mounted at the forward end of the plow for vertical swinging movement with respect to the plow, said presser rod extending rearwardly beyond said colter, and means on said arm for supporting the rear end of said presser rod including means for adjusting said rod vertically relative to said arm and for fixing said rod in adjusted position.

9. In combination with a plow having a colter supported on an arm mounted for vertical adjustment with respect to said plow, a presser rod mounted at the forward end of the plow for vertical swinging movement with respect to the plow, said presser rod extending rearwardly longitudinally of the plow and being bifurcated at its rear end into two sections, one of said sections being disposed on one side of said colter and supported on said arm, the other of said sections extending on the opposite side of said colter and spaced laterally from and independent of said colter-carrying arm.

10. In combination with a plow beam, a plow body mounted on the beam, a standard secured on the beam and vertically adjustable relative thereto, a bifurcated member attached to the lower end of the standard and extending rearwardly, a disk colter operatively mounted between the arms of said member at the rear ends thereof, a presser rod attached to the forward part of the beam and extending downwardly and rearwardly to a given point in advance of the colter and thence rearwardly in parallelism with the ground and curved upwardly rearwardly of the colter, and a support for said rod mounted on one arm of said member, said support including means for adjustably fixing the position of said rod vertically relative to said colter.

11. In combination with a plow having a vertically adjustable arm and a rolling colter journaled thereon, a trash guide, means for attaching the forward end of said guide to said plow, means for supporting the rear end of said guide on said arm, and means for vertically adjustably fixing the position of the last-named support independent of the adjustment of said arm.

12. In combination with a plow, a colter-supporting structure adjustably mounted thereon, a trash guide, means for supporting one end of said guide independent of said structure, and means for supporting the other end of said guide on said structure, said trash guide being slidable longitudinally on the last named guide-supporting means to compensate for adjustments of said colter-supporting structure.

13. In combination with a plow, a colter-supporting structure adjustably mounted thereon, a trash guide, means for supporting one end of said guide independent of said structure, means for supporting the other end of said guide on said structure, said trash guide being slidable longitudinally on the last named guide-supporting means to compensate for adjustments of said colter-supporting structure, and means for independently adjusting said guide relative to said structure.

14. In combination with a plow, a colter-supporting structure mounted thereon, a trash guide comprising a rod, means for attaching said rod to said plow, and an eyebolt carried on said structure, said rod being disposed within and supported by the eye of said bolt.

15. In combination with a plow having a beam, a colter having an adjustable support on said beam, a bifurcated trash guide disposed longitudinally of said plow and straddling said colter, means for attaching said guide to said plow beam ahead of said colter and independent of said colter support, an annular member carried on said support, one of the arms of said bifurcated guide extending through and supported by said member, whereby adjustments of said colter support are compensated for by longitudinal movement of said guide within said member.

16. In combination with a plow, a colter support, a rotatable disc colter mounted thereon, a first eyebolt forming an axle for said colter, a second eyebolt extending through the eye of said first eyebolt and secured therein by nuts, a trash guide comprising a rod, and means for attaching the forward end of said rod to said plow, the rear end of said rod being inserted through the eye of said second eyebolt, the latter providing a support for said trash guide.

17. In combination with a plow, a colter support and a trash guide, said trash guide comprising a rod attached at its forward end to said plow and extending rearwardly adjacent to one side of said colter support, and a second rod fixed to the first said rod ahead of said colter support and extending rearwardly on the opposite side of said support, and means for supporting one of said rods on said colter support, the other of said rods being independent thereof and spaced laterally therefrom.

18. In combination with a plow having a beam and a colter-carrying arm supported on said beam for lateral swinging movement relative thereto, a colter journaled at the outer end of said arm, a trash guide comprising a unitary member supported at its forward end on said beam forwardly of said arm and extending rearwardly, and means for supporting the rear end of said guide at the outer end of said arm.

19. In combination with a plow having a beam and a colter supporting structure attached thereto, a colter axle disposed transversely of said beam and supported on said supporting structure, a rolling colter journaled on said axle, a trash guide supported at its forward end on said plow beam, and means for supporting the rear end of said guide on said colter axle.

20. In combination with a plow having a beam, a colter standard adjustably fixed thereto, a pair of laterally spaced arms extending rearwardly from said standard, a colter carried between said arms, a trash guide comprising a unitary member supported on said plow ahead of said standard and extending rearwardly adjacent said colter, and means for supporting the rear end of said guide member on one of said colter-carrying arms.

CARL G. STRANDLUND.